United States Patent
Kawahara

(10) Patent No.: US 10,358,103 B2
(45) Date of Patent: Jul. 23, 2019

(54) CONTROL DEVICE AND CONTROL METHOD FOR OCCUPANT PROTECTION DEVICE

(71) Applicant: FUJITSU TEN LIMITED, Kobe-shi, Hyogo (JP)

(72) Inventor: Terumi Kawahara, Kobe (JP)

(73) Assignee: FUJITSU TEN Limited, Kobe-shi (JP)

( * ) Notice: Subject to any disclaimer, the term of this patent is extended or adjusted under 35 U.S.C. 154(b) by 9 days.

(21) Appl. No.: 15/470,146

(22) Filed: Mar. 27, 2017

(65) Prior Publication Data

US 2017/0349126 A1    Dec. 7, 2017

(30) Foreign Application Priority Data

Jun. 2, 2016  (JP) .................................. 2016-110625

(51) Int. Cl.
  *B60R 21/015*  (2006.01)
  *B60R 21/017*  (2006.01)
  *B60R 21/01*   (2006.01)

(52) U.S. Cl.
  CPC .......... *B60R 21/015* (2013.01); *B60R 21/017* (2013.01); *B60R 2021/01211* (2013.01)

(58) Field of Classification Search
  CPC ............... B60R 21/015; B60R 21/017; B60R 2021/01211
  See application file for complete search history.

(56) References Cited

U.S. PATENT DOCUMENTS

| | | | | |
|---|---|---|---|---|
| 3,931,527 A * | 1/1976 | Oishi | ...................... | B60R 21/01 280/735 |
| 5,416,704 A * | 5/1995 | Takai | .................. | B60R 21/0173 180/282 |
| 5,668,528 A * | 9/1997 | Kitao | .................... | B60R 21/017 180/271 |
| 6,485,057 B1* | 11/2002 | Midorikawa | ........... | B60R 21/01 280/801.1 |
| 2005/0236211 A1* | 10/2005 | Hirota | ................ | B60N 2/42736 180/274 |
| 2016/0159307 A1* | 6/2016 | Fujiwara | ............... | B60R 21/207 280/729 |
| 2017/0057444 A1* | 3/2017 | Choi | ................. | B60R 21/01512 |
| 2017/0232919 A1* | 8/2017 | Miyata | ................ | B60R 21/0136 701/45 |
| 2017/0282833 A1* | 10/2017 | Nagatsu | ................ | B60R 21/207 |

FOREIGN PATENT DOCUMENTS

| JP | 2007-153118 A | 6/2007 |
|---|---|---|
| JP | 2007-153224 A | 6/2007 |

* cited by examiner

*Primary Examiner* — Courtney D Heinle
(74) *Attorney, Agent, or Firm* — Oliff PLC

(57) ABSTRACT

A control device for an occupant protection device includes a power supply unit and a controller. The power supply unit performs supply of power to a squib for activating the occupant protection device. The controller causes the power supply unit to perform the supply of power at a first timing when a first condition is satisfied and causes the power supply unit to perform the supply of power at a second timing when a second condition is satisfied. At least one of the controller and the power supply unit prohibits, for a predetermined time after performing the supply of power at an earlier one timing of the first and second timings, the supply of power at another timing when the first and second conditions are satisfied.

5 Claims, 8 Drawing Sheets

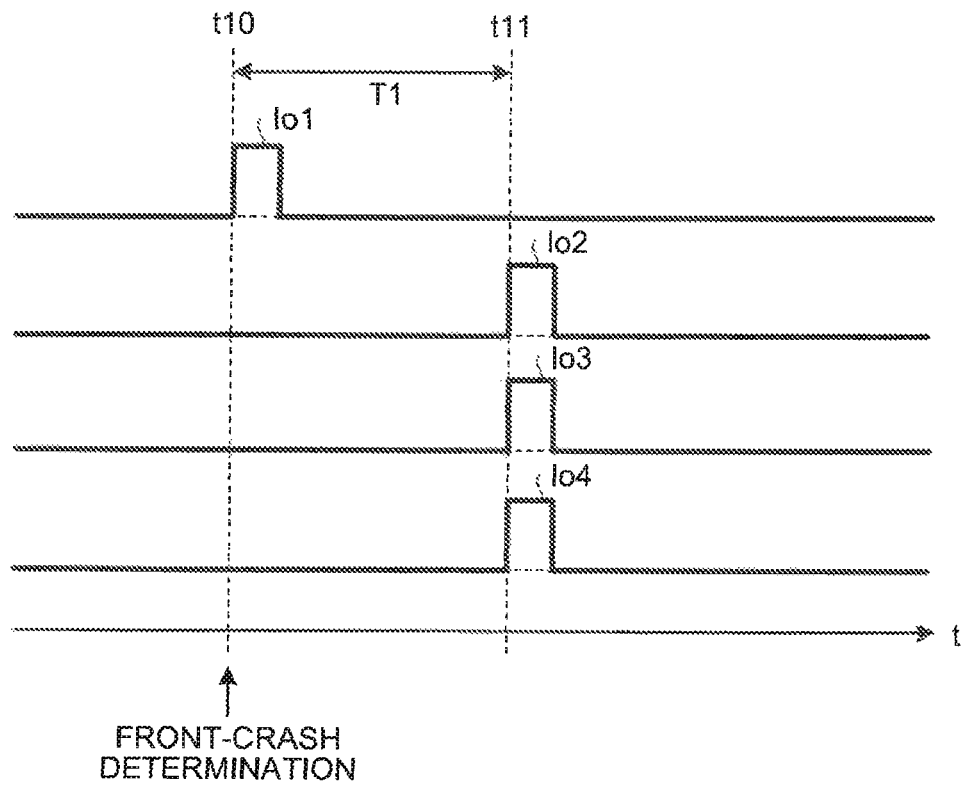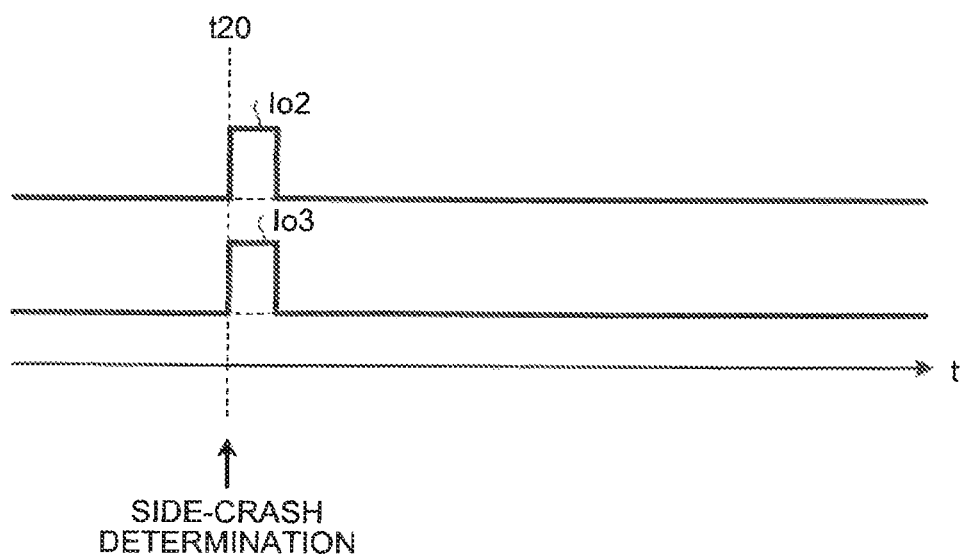

FRONT-CRASH DETERMINATION AND
SIDE-CRASH DETERMINATION

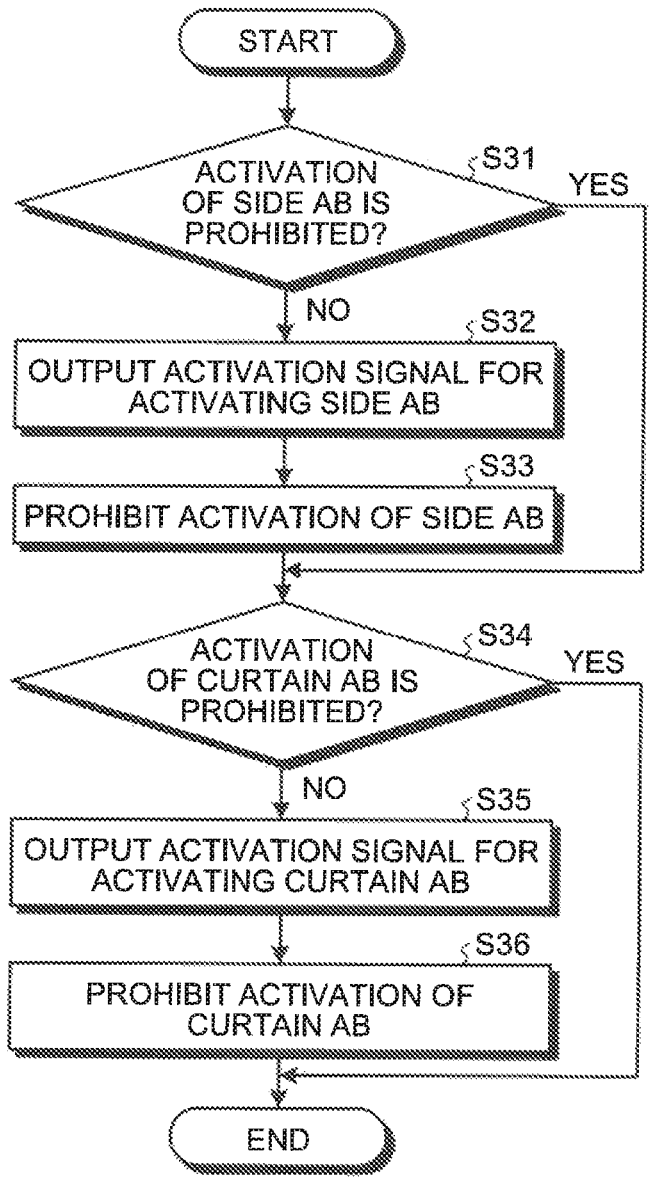

CONTROL DEVICE AND CONTROL METHOD FOR OCCUPANT PROTECTION DEVICE

CROSS-REFERENCE TO RELATED APPLICATION

This application is based upon and claims the benefit of priority of the prior Japanese Patent Application No. 2016-110625, filed on Jun. 2, 2016 the entire contents of which are incorporated herein by reference.

FIELD

The embodiment discussed herein is directed to a control device and a control method for an occupant protection device.

BACKGROUND

There is known a conventional control method for activating occupant protection devices such as pretensioners of an airbag and a seat belt. In the control method, an occupant protection device to be activated and its starting timing are set in accordance with a crash situation of a vehicle.

For example, there is known a control method in which a front-crash airbag is deployed in the event of a front crash of a vehicle and a side-crash airbag is deployed in the event of a side crash of the vehicle, and a front-crash airbag is deployed and then a side-crash airbag is deployed in the event of an oblique crash (for example, see Japanese Laid-open Patent Publication No. 2007-153224).

However, in the conventional control method, there may be performed a process for activating the same occupant protection device at different times when a plurality of conditions are satisfied simultaneously or continuously. Although the occupant protection device is activated by supplying power to a squib provided in the occupant protection device, there is a possibility that the squib supplied with power is short-circuited through ground or the like.

For that reason, when the squib is short-circuited through ground or the like at the first starting timing, for example, there is a possibility that power is further supplied to the squib at the following starting timings, and thus there is a problem in terms of power consumption.

SUMMARY

According to an aspect of an embodiment, a control device for an occupant protection device includes a power supply unit and a controller. The power supply unit performs supply of power to a squib for activating the occupant protection device. The controller causes the power supply unit to perform the supply of power at a first timing when a first condition is satisfied and causes the power supply unit to perform the supply of power at a second timing when a second condition is satisfied. At least one of the controller and the power supply unit performs the supply of power at an earlier one timing of the first and second timings and then prohibits the supply of power at another timing when the first and second conditions are satisfied.

BRIEF DESCRIPTION OF DRAWINGS

The present invention can be appreciated more completely and advantages thereof could be easily understood in the description of an embodiment below with reference to the accompanying drawings.

FIG. 5 is a diagram illustrating an activation process example of the occupant protection device when front-crash determination is performed;

FIG. 6 is a diagram illustrating an activation process example of the occupant protection device when side-crash determination is performed;

FIG. 11 is a flowchart illustrating an example of a processing procedure for a side crash.

DESCRIPTION OF EMBODIMENTS

An exemplary embodiment of a control device and a control method for an occupant protection device disclosed in the present application will be explained in detail below with reference to the accompanying drawings. The present invention is not limited to the embodiment explained below.

1. Brief of Control Method for Occupant Protection Device

Figure 1A:
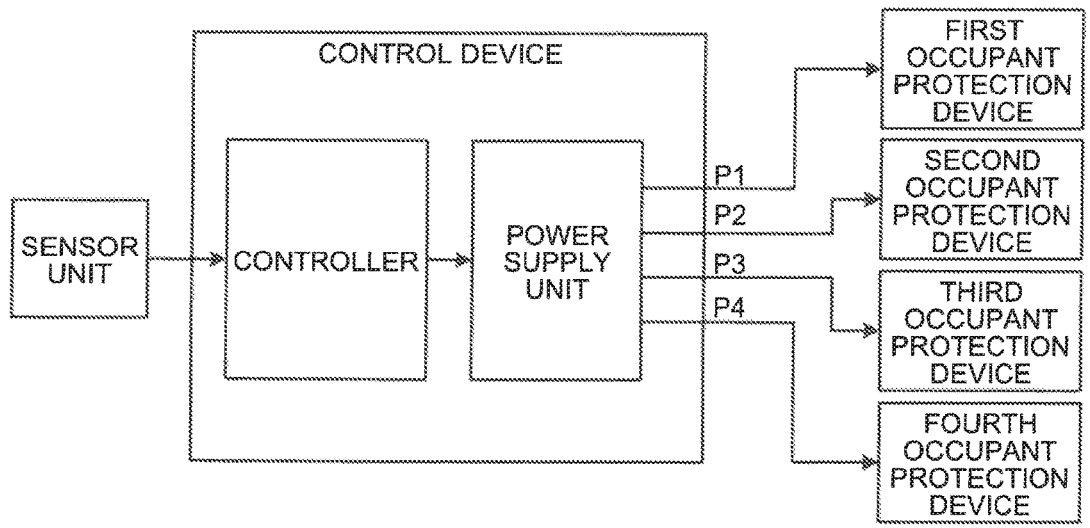
FIGS. 1A and 1B are diagrams explaining a control method for an occupant protection device according to an embodiment.
Figure 1B:
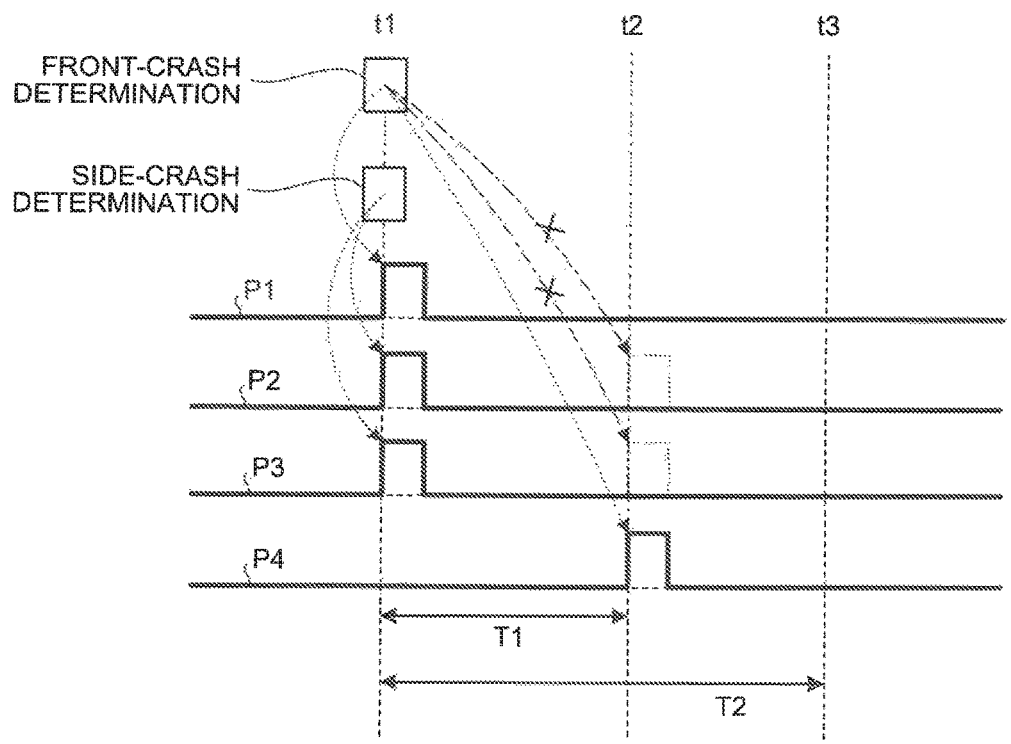

First, the brief of a control method for an occupant protection device according to the embodiment will be explained. FIGS. 1A and 1B are diagrams explaining the control method for the occupant protection device according to the embodiment. The control method is performed by a control device such as an electrical control unit (ECU) placed in a vehicle.

As illustrated in FIG. 1A, a control device according to the embodiment activates first to fourth occupant protection devices (hereinafter, may be collectively referred to as occupant protection device) on the basis of a detection result detected by a sensor unit that detects shock. The first to fourth occupant protection devices are, for example, pretensioners of an airbag and a seat belt, and each occupant protection device is activated when power is supplied to a built-in squib.

The control device includes a controller and a power supply unit. The controller controls the power supply unit on the basis of a detection result detected by the sensor unit to cause the power supply unit to supply powers P1 to P4 to squibs of the first to fourth occupant protection devices.

For example, when it is determined that a detection condition (example of first condition) on a crash (hereinafter, referred to as front crash) against the front face of a vehicle is satisfied on the basis of a detection result detected by the sensor unit (hereinafter, may be referred to as front-crash determination), the controller first activates the first occupant protection device and then simultaneously activates the second to fourth occupant protection devices after a predetermined time passes.

On the other hand, when it is determined that a detection condition (example of second condition) on a crash (hereinafter, referred to as side crash) against the lateral side of the vehicle is satisfied on the basis of the detection result detected by the sensor unit (hereinafter, may be referred to as side-crash determination), the controller simultaneously activates the second and third occupant protection devices.

Herein, it is assumed that the controller determines that front and side crashes occur simultaneously on the basis of the detection result detected by the sensor unit. FIG. 1B is a diagram illustrating a process when the front-crash determination and the side-crash determination are performed simultaneously.

As illustrated in FIG. 1B, the controller simultaneously performs the front-crash and side-crash determinations at a time t1 (example of first timing), and controls the power supply unit to perform an activation process corresponding to the front-crash determination and an activation process corresponding to the side-crash determination.

In other words, at the time t1, the controller causes the power supply unit to supply the power P1 to the squib of the first occupant protection device as the activation process corresponding to the front-crash determination, and causes the power supply unit to supply the powers P2 and P3 to the respective squibs of the second and third occupant protection devices as the activation process corresponding to the side-crash determination. As a result, the first to third occupant protection devices are activated.

As described above, after performing the activation processes of the first to third occupant protection devices, the controller prohibits the activation processes of the first to third occupant protection devices between the time t1 and a time t3 after a predetermined time T2 from that point. Then, the controller performs the activation process corresponding to the front-crash determination at a time t2 (example of second timing) after a predetermined time T1.

Although activation processes at the time t2 are the activation processes of the second to fourth occupant protection devices, the activation processes of the second and third occupant protection devices are prohibited as described above. For that reason, at the time t2, the controller does not perform the activation processes of the second and third occupant protection devices and performs the activation process of only the fourth occupant protection device.

When the squib of the occupant protection device is supplied with power, the squib may cause anomaly (hereinafter, referred to as short-circuit anomaly), for example, such that the squib is short-circuited through ground. For that reason, if short-circuit anomaly occurs in the squib due to the supply of power at the first timing when performing the activation process of the same occupant protection device at the plurality of timings (times t1 and t2), power is supplied from the power supply unit toward the squib (for example, grand via squib) having short-circuit anomaly at the next timing, and thus power is consumed.

On the other hand, after performing the activation processes of the second and third occupant protection devices corresponding to the side-crash determination, the controller prohibits the activation processes of the second and third occupant protection devices corresponding to the front-crash determination. For that reason, even if short-circuit anomaly occurs in the squibs of the second and third occupant protection devices due to the supply of the powers P2 and P3 at the time t1, the powers P2 and P3 are not supplied from the power supply unit to the second and third occupant protection devices at the time t2, and thus power is not consumed. For that reason, it is possible to suppress the consumption of power.

The process for prohibiting the activation processes of the second and third occupant protection devices may be performed by the power supply unit instead of the controller. For example, even if there is a request from the controller, the power supply unit does not perform the supply of the powers P2 and P3 to the second and third occupant protection devices between a time, of the supply of the powers P2 and P3 in the times t1 to t2, and the time t3. This can also result in reducing power consumption. Hereinafter, the occupant protection system including the control device according to the embodiment will be specifically explained.

2. Occupant Protection System

Figure 2:
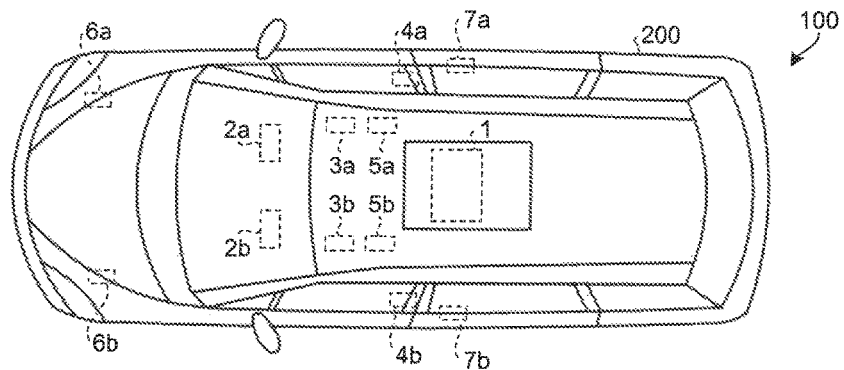
FIG. 2 is a diagram illustrating an arrangement example of an occupant protection system according to the embodiment.

FIG. 2 is a diagram illustrating an arrangement example of an occupant protection system 100 according to the embodiment. The occupant protection system 100 illustrated in FIG. 2 includes an ECU 1 (example of control device for occupant protection device), front airbags 2a, 2b, side airbags 3a, 3b, curtain airbags 4a, 4b, pretensioners 5a, 5b, front sensors 6a, 6b, and side sensors 7a, 7b. The occupant protection system 100 is placed in a vehicle 200.

The front airbag 2a is an airbag that is placed in the front of a driver's seat, and the front airbag 2b is an airbag that is placed in the front of an assistant driver's seat. The side airbag 3a is an airbag that is placed in the lateral side of the driver's seat, and the side airbag 3b is an airbag that is placed in the lateral side of the assistant driver's seat.

The curtain airbag 4a is an airbag that is placed in the right side of the vehicle 200, and the curtain airbag 4b is an airbag that is placed in the left side of the vehicle 200. The pretensioner 5a is a pretensioner that performs retraction of a seat belt of the driver's seat, and the pretensioner 5b is a pretensioner that performs retraction of a seat belt of the assistant driver's seat.

The front airbags 2a, 2b, the side airbags 3a, 3b, the curtain airbags 4a, 4b, and the pretensioners 5a, 5b are an example of the occupant protection device. Hereinafter, they may be collectively referred to as an occupant protection device 9.

The front sensors 6a, 6b are a crash detection sensor and are arranged in the front of the vehicle 200. When an obstacle (for example, another vehicle) crashes against the front of the vehicle 200, for example, the front sensors 6a, 6b detect a degree of shock of the front of the vehicle 200. The front sensors 6a, 6b output detection signals Sd1 and Sd2 that include a shock value indicating the detected degree of shock.

The side sensors 7a, 7b are a crash detection sensor and are arranged in the lateral side of the vehicle 200. When an obstacle (for example, another vehicle) crashes against the lateral side of the vehicle 200, for example, the side sensors 7a, 7b detect a degree of shock of the lateral side of the vehicle 200. The side sensors 7a, 7b outputs detection signals Sd3 and Sd4 that include a shock value indicating the detected degree of shock.

Hereinafter, the front sensors 6a, 6b and the side sensors 7a, 7b may be collectively referred to as a sensor 6. Moreover, the connections between the ECU 1 and each component of the occupant protection device 9 and between the ECU 1 and each component of the sensor 6 are performed by, for example, a plurality of electric wires that constitute a wire harness (not illustrated).

3. ECU

Figure 3:
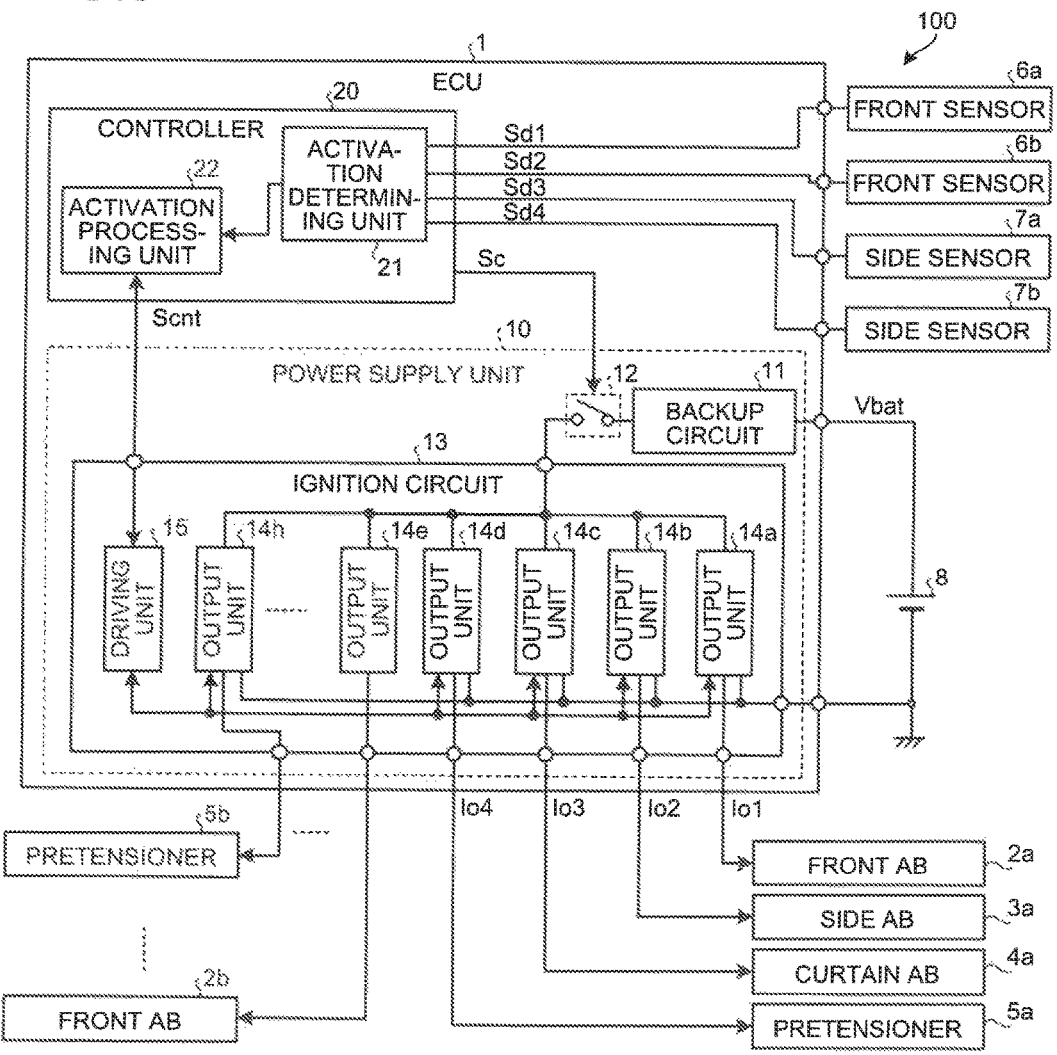
FIG. 3 is a diagram illustrating a configuration example of a control device according to the embodiment.

FIG. 3 is a diagram illustrating a configuration example of the ECU (electrical control unit) 1. As illustrated in FIG. 3, the ECU 1 includes a power supply unit 10 and a controller 20.

3.1. Power Supply Unit

Figure 4:
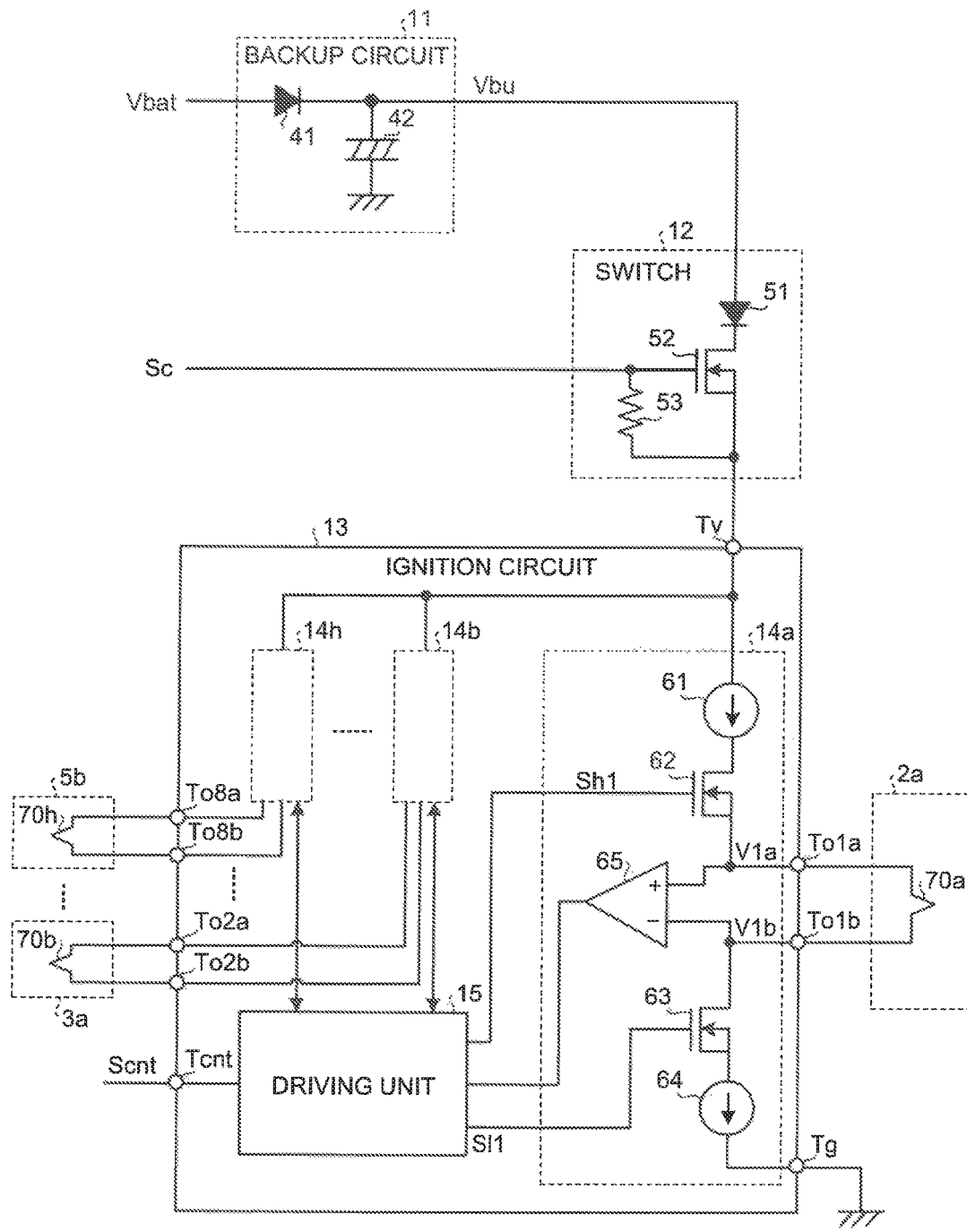
FIG. 4 is a diagram illustrating a configuration example of a power supply unit according to the embodiment.

As illustrated in FIG. 3, the power supply unit 10 includes a backup circuit 11, a switch 12, and an ignition circuit 13. FIG. 4 is a diagram illustrating a configuration example of the power supply unit 10.

As illustrated in FIG. 4, the backup circuit 11 includes a diode 41 for backflow prevention and a capacitor 42 for charge accumulation. A voltage Vbat (hereinafter, referred to as battery voltage Vbat) output from a battery 8 (see FIG. 3) is applied to the capacitor 42 via the diode 41. As a result, electric charges (power) for backup are accumulated into the capacitor 42.

As illustrated in FIG. 4, the switch 12 includes a diode 51, a switching element 52, and a resistance 53. The diode 51 is a diode for backflow prevention that is connected between the backup circuit 11 and the switching element 52.

The switching element 52 is connected between the diode 51 and the ignition circuit 13. The switching element 52 is, for example, an N-channel MOSFET (metal-oxide-semiconductor field-effect transistor), and its drain is connected to a cathode of the diode 51 and its source is connected to the ignition circuit 13.

A driving signal Sc from the controller 20 is input into a control terminal (for example, gate) of the switching element 52. The switching element 52 turns on when the driving signal Sc is a High level, and then the battery voltage Vbat is input into the ignition circuit 13 via the backup circuit 11 and the switch 12.

As illustrated in FIG. 4, the ignition circuit 13 includes an input terminal Tv, output terminals To1a to To8a, To1b to To8b, a grounding terminal Tg, a communication terminal Tcnt, output units 14a to 14h (hereinafter, may be collectively referred to as output unit 14), and a driving unit 15. The ignition circuit 13 is constituted by, for example, an application specific integrated circuit (ASIC).

The input terminal Tv receives a voltage output from the backup circuit 11 by way of the switch 12. The output terminals To1a to To8a and To1b to To8b are connected to squibs provided in the occupant protection device 9. For example, the output terminals To1a and To1b are connected to a squib 70a of the front airbag 2a, and the output terminals To2a and To2b are connected to a squib 70b of the side airbag 3a. Moreover, the output terminals To8a and To8b are connected to a squib 70h of the pretensioner 5b. Hereinafter, the squibs 70a to 70h may be collectively referred to as a squib 70.

The grounding terminal Tg is connected to ground (for example, body of vehicle 200). The communication terminal Tcnt is connected to the controller 20 and the driving unit 15, and inputs into the driving unit 15 a signal to be transmitted from the controller 20 to the ignition circuit 13 and outputs to the controller 20 a signal to be transmitted from the driving unit 15.

The output unit 14a is a circuit that is connected to the front airbag 2a to perform the power supply to the front airbag 2a. The output unit 14b is a circuit that is connected to the side airbag 3a to perform the power supply to the side airbag 3a. Moreover, the output unit 14c is a circuit that is connected to the curtain airbag 4a to perform the power supply to the curtain airbag 4a. The output unit 14d is a circuit that is connected to the pretensioner 5a to perform the power supply to the pretensioner 5a.

Similarly, the output units 14e to 14h are respectively connected to the front airbag 2b, the side airbag 3b, the curtain airbag 4b, and the pretensioner 5b to perform the power supply. Because the output units 14a to 14h have the same configuration, the configuration of the output unit 14a is mainly explained below. As illustrated in FIG. 4, the output unit 14a includes current limiters 61, 64, switching elements 62, 63, and a difference voltage detecting unit 65.

The switching elements 62 and 63 are an N-channel MOSFET, for example. Moreover, the switching elements 62 and 63 may be, for example, a switching element such as an insulated gate bipolar transistor (IGBT) and a semiconductor relay.

The current limiter 61 and the switching element 62 are serially connected to each other, and are placed between the input terminal Tv and the output terminal To1a. The switching element 63 and the current limiter 64 are serially connected to each other, and are placed between the output terminal To1b and the grounding terminal Tg.

Currents to be output to the squib 70a via the output terminals To1a and To1b are restricted by the current limiters 61 and 64. For that reason, even if an electric wire connecting the output terminal To1a and the squib 70a contacts with the body of the vehicle 200 and the battery voltage Vbat, for example, it is possible to inhibit excessive currents from flowing into the switching elements 62 and 63.

The difference voltage detecting unit 65 includes, for example, a differential amplifier, and detects a difference voltage $\Delta V$ (=V1a−V1b) that is a voltage difference between the output terminals To1a and To1b and outputs the detection result to the driving unit 15. Moreover, it is sufficient that the difference voltage detecting unit 65 has the configuration that can detect the difference voltage $\Delta V$. Therefore, the difference voltage detecting unit 65 is not limited to the configuration including a differential amplifier.

When receiving an activation signal Scntx (x is value of 1 to 8) input from the controller 20 via the communication terminal Tcnt, the driving unit 15 holds driving signals Shx and Slx (x is value of 1 to 8) as a High level by a predetermined time Ta. As a result, a current (hereinafter, ignition current Io) for activating the occupant protection device 9 is output from the output unit 14x corresponding to the driving signals Shx and Slx to the squib 70 of the corresponding occupant protection device 9.

For example, when receiving the activation signal Scnt1, the driving unit 15 holds the driving signals Sh1 and Sl1 as a High level by the predetermined time Ta and outputs an ignition current Io1 for activating the front airbag 2a from the output unit 14a to the squib 70a of the front airbag 2a. Moreover, when receiving the activation signal Scnt2, the driving unit 15 holds the driving signals Sh2 and Sl2 as a High level by the predetermined time Ta and outputs an ignition current Io2 for activating the side airbag 3a from the output unit 14b to the squib 70b of the side airbag 3a.

When receiving the activation signal Scnt3, the driving unit 15 holds the driving signals Sh3 and Sl3 as a High level by the predetermined time Ta and outputs an ignition current Io3 for activating the curtain airbag 4a from the output unit 14c to the squib 70c of the curtain airbag 4a. Moreover, when receiving the activation signal Scnt4, the driving unit 15 holds the driving signals Sh4 and Sl4 as a High level by the predetermined time Ta and outputs an ignition current Io4 for activating the pretensioner 5a from the output unit 14d to the squib 70d of the pretensioner 5a.

Similarly, when receiving each of the activation signals Scnt5 to Scnt8, the driving unit 15 holds the corresponding driving signal as a High level by the predetermined time Ta and outputs an ignition current for activating the corresponding occupant protection device 9 from the corresponding output unit 14 to the squib 70 of the corresponding occupant protection device 9.

Hereinafter, the activation signals Scnt1 to Scnt8 may be collectively referred to as an activation signal Scnt.

The driving unit 15 detects open states of the squibs 70a to 70h on the basis of voltage states at the output units 14a to 14h. Because an open state detection process is common to the squibs 70a to 70h, an open state detection process for the squib 70a will be explained below as one example.

When receiving the activation signal Scnt1, the driving unit 15 outputs the driving signals Sh1 and Sl1 that are in a High-level state by the predetermined time Ta as described above. Then, while being outputting the High-level driving signals Sh1 and Sl1, the driving unit 15 determines whether the difference voltage ΔV detected by the difference voltage detecting unit 65 is not less than a predetermined value Vth.

When the difference voltage ΔV is not less than the predetermined value Vth, the driving unit 15 determines that the front airbag 2a is normally activated, and outputs a response signal Sok indicating activation success to the controller 20. On the other hand, when the difference voltage ΔV is less than the predetermined value Vth, the driving unit 15 determines that the front airbag 2a is not normally activated, and outputs a response signal Sng indicating activation failure to the controller 20.

The ignition circuit 13 includes a failure detection unit (not illustrated) that detects failures of the output units 14a to 14h. The driving unit 15 notifies the controller 20 of a failure detection result detected by the failure detection unit via the communication terminal Tcnt. As a result, the controller 20 can grasp whether the ignition circuit 13 is normal. When the ignition circuit 13 is normal, the controller 20 sets the driving signal Sc as a Low level to stop the voltage supply to the ignition circuit 13.

3.2 Configuration of Controller

The controller 20 includes an activation determining unit 21 and an activation processing unit 22. The controller 20 includes a microcomputer and various types of circuits that have a central processing unit (CPU), a read only memory (ROM), a random access memory (RAM), an input-output port, and the like. The CPU of the microcomputer reads and executes programs stored in the ROM to realize functions of the activation determining unit 21 and the activation processing unit 22. Moreover, the controller 20 can be realized by hardware such as ASIC.

The activation determining unit 21 determines whether a front-crash detection condition and a side-crash detection condition are satisfied on the basis of the detection signals Sd1 and Sd2 respectively output from the front sensors 6a and 6b and the detection signals Sd3 and Sd4 respectively output from the side sensors 7a and 7b.

For example, the front-crash detection condition is a condition indicating that a shock value included in the detection signals Sd1 and Sd2 is not less than a predetermined threshold TH1, and the side-crash detection condition is a condition indicating that a shock value included in the detection signals Sd3 and Sd4 is not less than a predetermined threshold TH2.

When the front-crash determination is performed, namely, when the activation determining unit 21 determines that the front-crash detection condition is satisfied, the activation processing unit 22 transmits the plurality of activation signals Scnt corresponding to the front crash to the power supply unit 10 at the plurality of timings corresponding to the front crash. FIG. 5 is a diagram illustrating an activation process example of the occupant protection device 9 when the front-crash determination is performed.

It is assumed that a time from the output of the activation signal Scnt to the supply of the ignition current to the occupant protection device 9 by the power supply unit 10 can be ignored. Hereinafter, although the controls for the front airbag 2a, the side airbag 3a, the curtain airbag 4a, and the pretensioner 5a will be mainly explained, the controls for the front airbag 2b, the side airbag 3b, the curtain airbag 4b, and the pretensioner 5b are also performed similarly.

As illustrated in FIG. 5, the controller 20 outputs the activation signal Scnt1 from the activation processing unit 22 at a time t10 at which the front-crash determination is performed, and the driving unit 15 of the power supply unit 10 holds the driving signals Sh1 and Sl1 as a High level for a certain fixed time at a timing at which the activation signal Scnt1 is received. As a result, the ignition current Io1 is output to the squib 70a of the front airbag 2a, and the front airbag 2a is activated.

The squib 70 is a heating wire, for example, and is an ignition member for igniting an adjacent initiator. When the comparatively large ignition current Io flows into the squib 70, the squib 70 generates heat to ignite the adjacent initiator. The squib 70 and an initiator are placed inside, for example, an inflator that supplies gas to the front airbag 2a and the side airbag 3a.

The activation processing unit 22 outputs the activation signals Scnt2 to Scnt4 to the power supply unit 10 at a time t11 after the predetermined time T1 from the time t10. The driving unit 15 of the power supply unit 10 holds the driving signals Sh2 to Sh4 and Sl2 to Sl4 as a High level for a certain fixed time on the basis of the activation signals Scnt2 to Scnt4. As a result, the ignition currents Io2 to Io4 are output to the squibs 70b to 70d of the side airbag 3a, the curtain airbag 4a, and the pretensioner 5a, and the side airbag 3a, the curtain airbag 4a, and the pretensioner 5a are activated.

When the side-crash determination is performed, namely, when the activation determining unit 21 determines that the side-crash detection condition is satisfied, the activation processing unit 22 transmits the plurality of activation signals Scnt corresponding to the side crash to the power supply unit 10 at a predetermined timing. FIG. 6 is a diagram illustrating an activation process example of the occupant protection device 9 when the side-crash determination is performed.

As illustrated in FIG. 6, the controller 20 outputs the activation signals Scnt2 and Scnt3 from the activation processing unit 22 at a time t20 at which the side-crash determination is performed. The driving unit 15 of the power supply unit 10 holds the driving signals Sh2, Sl2, Sh3, and Sl3 as a High level for a certain fixed time on the basis of the activation signals Scnt2 and Scnt3. As a result, the ignition currents Io2 and Io3 are output to the squibs 70b and 70c of the side airbag 3a and the curtain airbag 4a, and thus the side airbag 3a and the curtain airbag 4a are activated.

Figure 7:
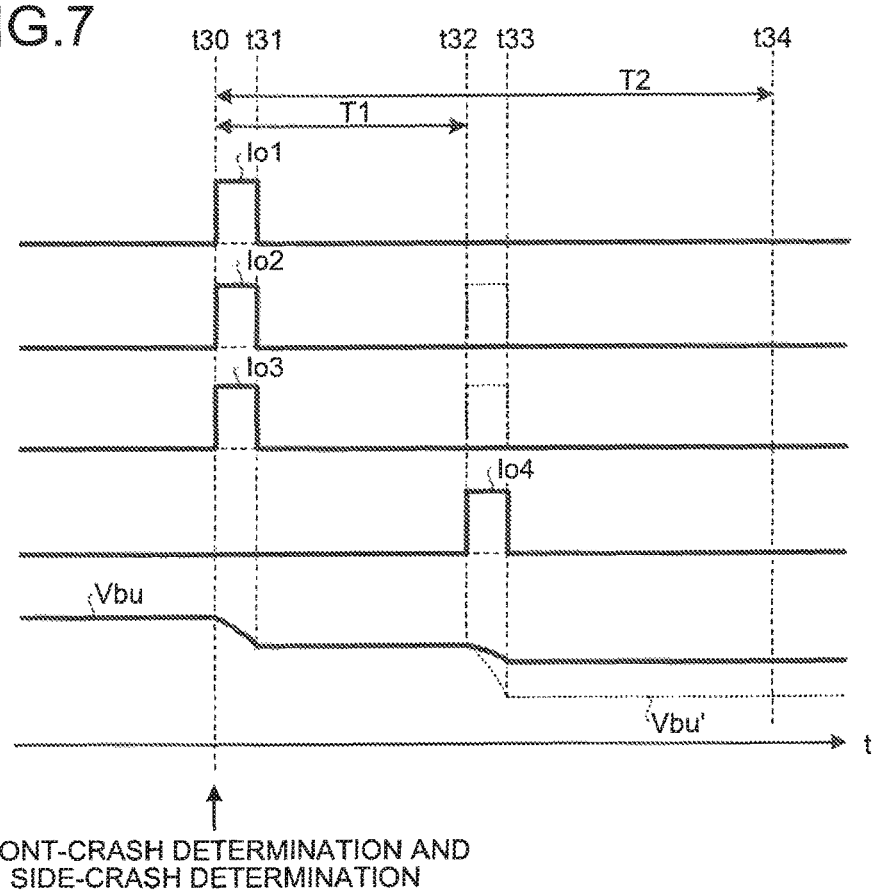
FIG. 7 is a diagram illustrating an activation process example of the occupant protection device when front-crash determination and side-crash determination are simultaneously performed.

Next, a case where the front-crash determination and the side-crash determination are simultaneously performed will be explained. FIG. 7 is a diagram illustrating an activation process example of the occupant protection device when the front-crash determination and the side-crash determination are simultaneously performed. Herein, it is assumed that the connection between the battery 8 and the ECU 1 is cut off due to a crash against an obstacle at a time t30.

The activation processing unit 22 outputs to the power supply unit 10 the activation signal Scnt1 corresponding to the front-crash determination and the activation signals Scnt2 and Scnt3 corresponding to the side-crash determination at the time t30 at which the front-crash determination and the side-crash determination are simultaneously performed.

For that reason, at the time t30, the ignition current Io1 is supplied to the squib 70a of the front airbag 2a due to the activation signal Scnt1, and the ignition currents Io2 and Io3 are supplied to the squibs 70b and 70c of the side airbag 3a and the curtain airbag 4a due to the activation signals Scnt2 and Scnt3. As a result, the front airbag 2a, the side airbag 3a, and the curtain airbag 4a are activated.

As described above, the connection between the battery 8 and the ECU 1 is cut off at the time t30, and a voltage Vbu (hereinafter, referred to as backup voltage Vbu) of the capacitor 42 is supplied to the output unit 14. For that reason, power accumulated in the capacitor 42 is consumed by the output units 14a to 14c, and the backup voltage Vbu decreases in a time interval (between times t30 to t31) in which the ignition currents Io1 to Io3 are being output, as illustrated in FIG. 7.

The activation processing unit 22 outputs the activation signals Scnt1 to Scnt3 (at a time t32 after the predetermined time T1 from the time t30, for example), and then receives a response signal Sak from the power supply unit 10. When the received response signal Sak includes the response signal Sng indicating activation failure of the occupant protection device 9, the activation processing unit 22 again transmits the activation signal Scnt for activating the occupant protection device 9 whose activation fails to the power supply unit 10. As a result, it is possible to perform the activation of the occupant protection device 9 with high precision.

On the other hand, when the received response signal Sak is the response signal Sok indicating activation success of the occupant protection device 9, the activation processing unit 22 performs an output prohibition process of the activation signal Scnt for the occupant protection device 9 corresponding to the response signal Sok. In the output prohibition process, the activation processing unit 22 performs a prohibition process for prohibiting the output of the activation signals Scnt1 to Scnt3 for activating the front airbag 2a, the side airbag 3a, and the curtain airbag 4a from the time t30 to a time t34 after a predetermined time T2 elapses. Moreover, the activation processing unit 22 can also perform the prohibition process from a time t31 at which the response signal Sak is received to a time after the predetermined time T2 elapses. Moreover, the activation processing unit 22 may not terminate the prohibition process.

The activation processing unit 22 outputs the activation signal Scnt4 corresponding to the front-crash determination to the power supply unit 10 at the time t32 after the predetermined time T1 elapses from the time t30. As described above, because the output of the activation signals Scnt2 and Scnt3 for activating the side airbag 3a and the curtain airbag 4a is prohibited, the activation processing unit 22 outputs only the activation signal Scnt4 for activating the pretensioner 5a to the power supply unit 10.

Herein, it is assumed that the outputs of the activation signals Scnt2 and Scnt3 are not prohibited and there is anomaly (short-circuit anomaly) that the squibs 70b and 70c are short-circuited on the ground. In this case, the ignition currents Io2 and Io3 as well as the ignition current Io4 are output at the time t32. For that reason, in comparison with when only the ignition current Io4 is output, the degradation of the backup voltage Vbu (see Vbu' of FIG. 7) increases, and thus there is a possibility that power by which the pretensioner 5a can be activated cannot be supplied to the squib 70d of the pretensioner 5a. For that reason, it is necessary to increase the electrostatic capacitance of the capacitor 42 so as to be able to activate the pretensioner 5a.

On the other hand, because the activation processing unit 22 according to the embodiment prohibits the outputs of the activation signals Scnt2 and Scnt3, the ignition currents Io2 and Io3 are not output even if the anomaly that the squibs 70b and 70c are short-circuited on the ground comes about. For that reason, in comparison with when the prohibition process is not performed, the electrostatic capacitance of the capacitor 42 can be reduced, and thus reduction in cost can be achieved while ensuring safety.

In the example described above, although the case where the front-crash determination and the side-crash determination are simultaneously performed has been mainly explained, the controller 20 can perform the prohibition process described above even if the front-crash determination and the side-crash determination are continuously performed within a predetermined time. Moreover, when the plurality of conditions for activating the same occupant protection device 9 at the same timing when satisfying a condition are continuously satisfied at different timings, the controller 20 can perform the prohibition process described above to reduce power consumption, for example.

Figure 8:
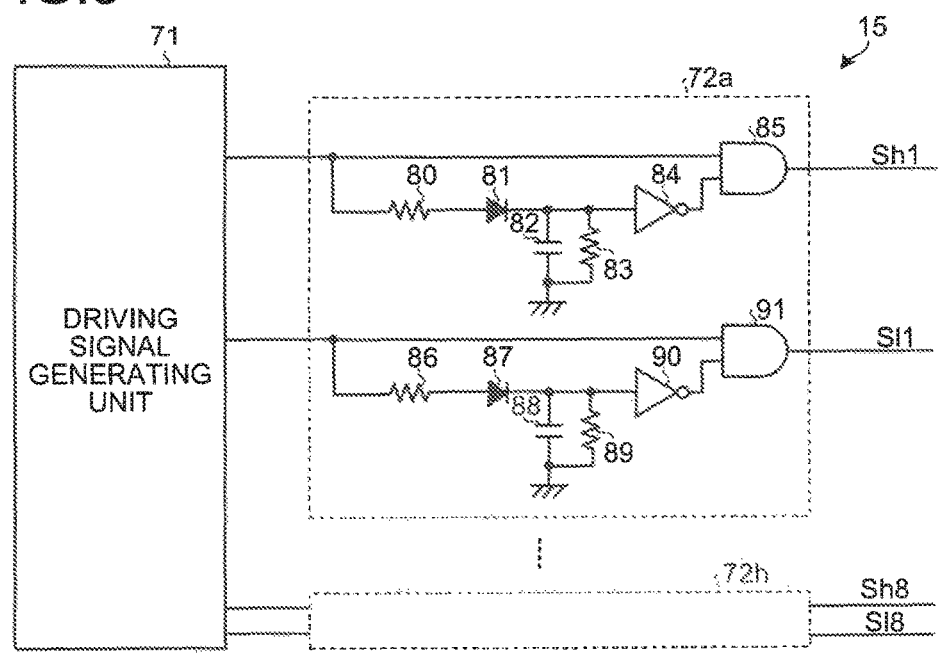
FIG. 8 is a diagram illustrating a configuration example of a driving unit illustrated in FIG. 3.

The output prohibition process can be performed by the power supply unit 10 in addition to or instead of the output prohibition process by the activation processing unit 22. FIG. 8 is a diagram illustrating a configuration example of the driving unit 15. The driving unit 15 illustrated in FIG. 8 includes a driving signal generating unit 71 and output prohibition processing units 72a to 72h (hereinafter, may be referred to as output prohibition processing unit 72). Moreover, because the output prohibition processing units 72a to 72h have the common configuration, the configuration and operation of the output prohibition processing unit 72a will be explained below as one example.

When receiving the activation signal Scnt from the controller 20, the driving signal generating unit 71 outputs the driving signals Sh1 to Sh8 and Sl1 to Sl8 corresponding to the activation signal Scnt. For example, when receiving the activation signal Scnt1 from the controller 20, the driving signal generating unit 71 outputs the driving signals Sh1 and Sl1 that are in a High-level state for the predetermined time Ta.

When the driving signals Sh1 and Sl1 output from the driving signal generating unit 71 are in a High-level state for the predetermined time T2, the output prohibition processing unit 72a passes through the High-level driving signals Sh1 and Sl1 without change. Then, between a time at which the levels of the driving signals Sh1 and Sl1 become a Low level from the High level and a time after the predetermined time T2 elapses from the Low-level time, the output prohibition processing unit 72a outputs the Low-level driving signals Sh1 and Sl1 to the output unit 14a regardless of the states of the driving signals Sh1 and Sl1.

As a result, even when the levels of the driving signals Sh1 and Sl1 repeatedly become a High level between a time at which the levels of the driving signals Sh1 and Sl1 become a High level and a time after the predetermined time T2 elapses from the High-level time, it is possible to prevent the switching elements 62 and 63 of the output unit 14a from being turned on. Moreover, because the activation processing unit 22 performs the output prohibition process in addition to the output prohibition process by the power supply unit 10, it is possible to perform the output prohibition process with high precision even if the activation processing unit 22 has a malfunction.

As illustrated in FIG. 8, the output prohibition processing unit 72a includes resistances 80, 83, 86, 89, diodes 81, 87, capacitors 82, 88, inverters 84, 90, and AND gates 85, 91. When the levels of the driving signals Sh1 and Sl1 become a High level from a Low level, currents flow into the capacitors 82 and 88 via the resistances 80 and 86 and the diodes 81 and 87.

For that reason, the voltages of the capacitors 82 and 88 increase gradually. As a result, the input voltages to the inverters 84 and 90 increase, and the outputs of the inverters 84 and 90 are changed from a High level to a Low level. As a result, even if the levels of the driving signals Sh1 and Sl1 become a High level, the High-level driving signals Sh1 and Sl1 are prohibited from being output from the AND gates 85 and 91. Moreover, a time between a time at which the levels of the driving signals Sh1 and Sl1 become a High level from a Low level and a time at which the outputs of the inverters 84 and 90 become a Low level can be adjusted by adjusting resistance values of the resistances 80 and 86 and electrostatic capacitance values of the capacitors 82 and 88.

After that, because electric charges accumulated in the capacitors 82 and 88 flow into the ground via the resistances 83 and 89, the voltages of the capacitors 82 and 88 decrease gradually. Then, when the predetermined time T2 elapses from a time at which the levels of the driving signals Sh1 and Sl1 become a Low level from a High level, the outputs of the inverters 84 and 90 are changed from a Low level to a High level. Moreover, a timing at which the outputs of the inverters 84 and 90 are changed from a Low level to a High level can be adjusted by adjusting electrostatic capacitance values of the capacitors 82 and 88 and resistance values of the resistances 83 and 89.

The configuration of the output prohibition processing unit 72 is not limited to the configuration illustrated in FIG. 8. For example, the output prohibition processing unit 72 may be constituted by only logic circuits, or may have a configuration that does not include inverters and AND gates.

3.3 Example of Processing Procedure Executed by Controller

Figure 9:
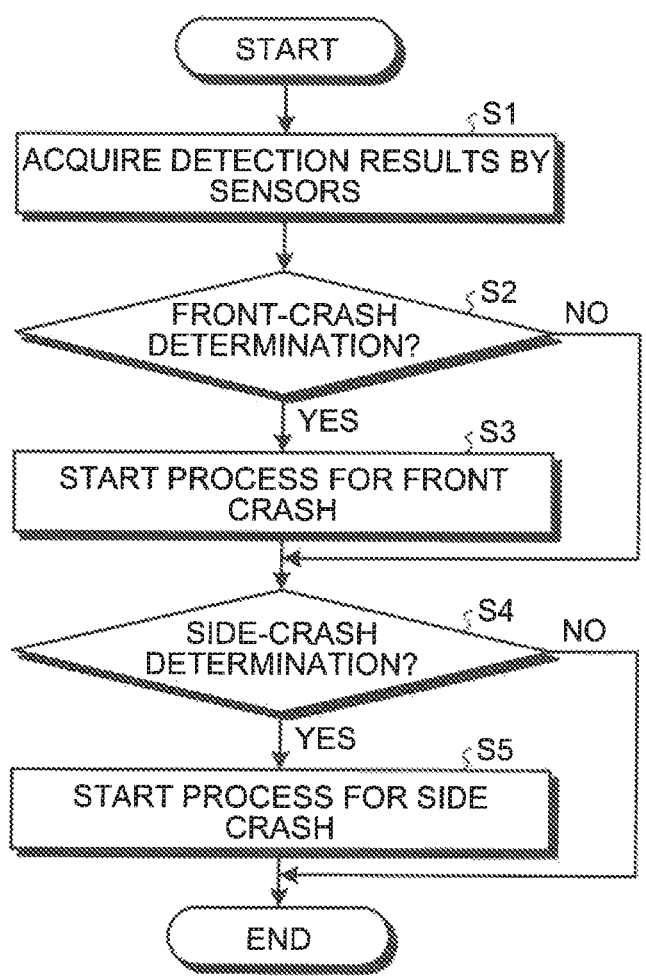
FIG. 9 is a flowchart illustrating an example of a processing procedure that is executed by a controller according to the embodiment.

FIG. 9 is a flowchart illustrating an example of a processing procedure that is executed by the controller 20. The processing procedure is a process that is executed repeatedly. As illustrated in FIG. 9, the activation determining unit 21 of the controller 20 receives the detection signals Sd1 to Sd4 output from the plurality of sensors 6, and acquires detection results by the plurality of sensors 6 (Step S1).

The activation determining unit 21 determines whether a front crash comes about on the basis of the detection results by the plurality of sensors 6 (Step S2). When it is determined that the front crash comes about (Step S2: Yes), the activation processing unit 22 starts a process for the front crash (Step S3). The process for the front crash is the process of Steps S11 to S21 illustrated in FIG. 10, and is below explained in detail.

When the process for the front crash is started in Step S3 or when it is determined that the front crash does not come about (Step S2: No), the activation determining unit 21 determines whether a side crash comes about on the basis of the detection results by the plurality of sensors 6 (Step S4). When the activation determining unit 21 determines that the side crash comes about (Step S4: Yes), the activation processing unit 22 starts a process for the side crash (Step S5). The process for the side crash is the process of Steps S31 to S36 illustrated in FIG. 11, and is below explained in detail.

When the process for the side crash is started in Step S5 or when it is determined that the side crash does not come about (Step S4: No), the controller 20 repeats the process from Step S1 in the next processing interval.

Figure 10:
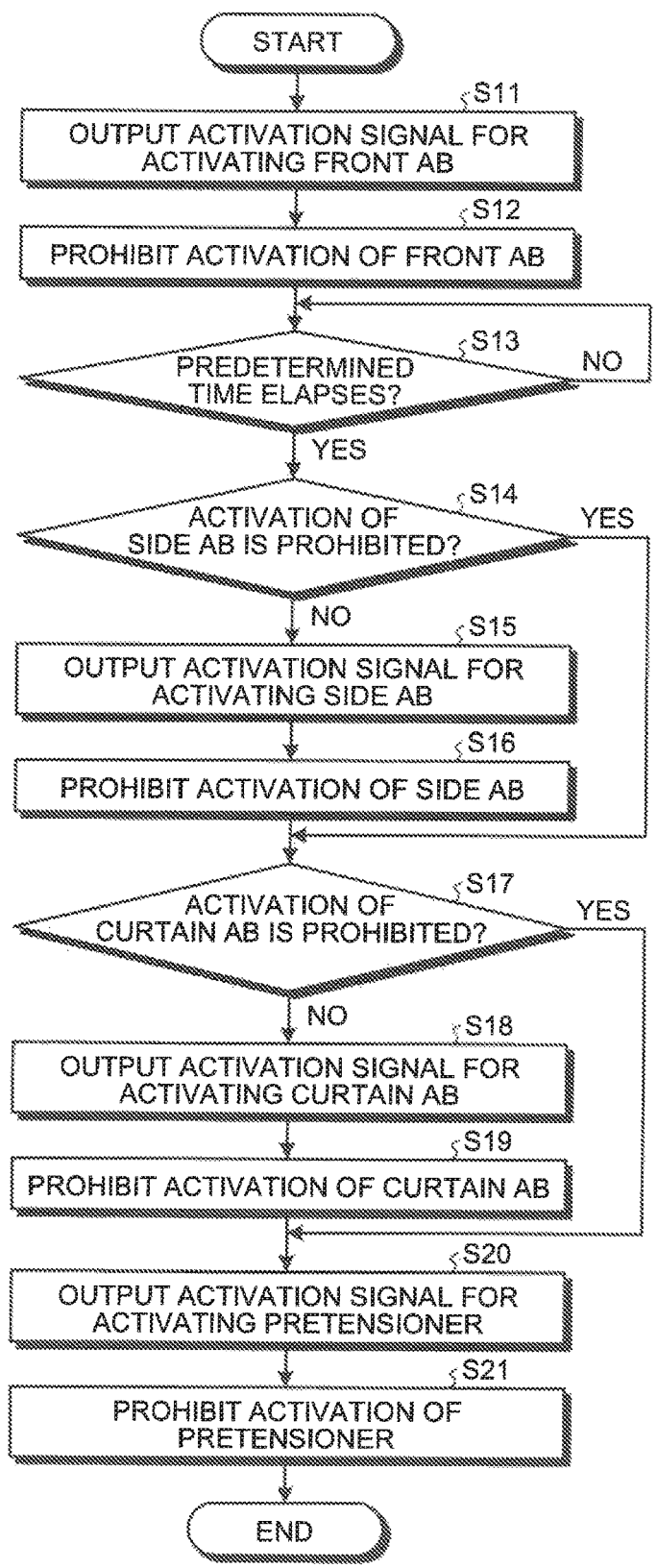
FIG. 10 is a flowchart illustrating an example of a processing procedure for a front crash.

FIG. 10 is a diagram illustrating an example of a processing procedure for the front crash. As illustrated in FIG. 10, the activation processing unit 22 outputs the activation signal Scnt1 for activating the front airbag 2a to the power supply unit 10 when the process for the front crash is started (Step S11). After that, the activation processing unit 22 prohibits the activation of the front airbag 2a for a predetermined time (Step S12).

After that, the activation processing unit 22 determines whether the predetermined time T1 elapses (Step S13), and awaits until the predetermined time T1 elapses. When it is determined that the predetermined time T1 elapses (Step S13: Yes), the activation processing unit 22 determines whether the activation of the side airbag 3a is prohibited (Step S14).

When it is determined that the activation of the side airbag 3a is not prohibited (Step S14: No), the activation processing unit 22 outputs the activation signal Scnt2 for activating the side airbag 3a to the power supply unit 10 (Step S15). After that, the activation processing unit 22 prohibits the activation of the side airbag 3a for a predetermined time (Step S16).

When the process of Step S16 is terminated or when it is determined that the activation of the side airbag 3a is prohibited (Step S14: Yes), the activation processing unit 22 determines whether the activation of the curtain airbag 4a is prohibited (Step S17).

When it is determined that the activation of the curtain airbag 4a is not prohibited (Step S17: No), the activation processing unit 22 outputs the activation signal Scnt3 for activating the curtain airbag 4a to the power supply unit 10 (Step S18). After that, the activation processing unit 22 prohibits the activation of the curtain airbag 4a for a predetermined time (Step S19).

When the process of Step S19 is terminated or when it is determined that the activation of the curtain airbag 4a is prohibited (Step S17: Yes), the activation processing unit 22 outputs the activation signal Scnt4 for activating the pretensioner 5a to the power supply unit 10 (Step S20). After that, the activation processing unit 22 prohibits the activation of the pretensioner 5a (Step S21), and terminates the process illustrated in FIG. 10.

FIG. 11 is a diagram indicating an example of a processing procedure for the side crash. As illustrated in FIG. 11, when the process for the side crash is started, the activation processing unit 22 determines whether the activation of the side airbag 3a is prohibited (Step S31).

When it is determined that the activation of the side airbag 3a is not prohibited (Step S31: No), the activation processing unit 22 outputs the activation signal Scnt2 for activating the side airbag 3a to the power supply unit 10 (Step S32). After that, the activation processing unit 22 prohibits the activation of the side airbag 3a for a predetermined time (Step S33).

When the process of Step S33 is terminated or when it is determined that the activation of the side airbag 3a is prohibited (Step S31: Yes), the activation processing unit 22 determines whether the activation of the curtain airbag 4a is prohibited (Step S34).

When it is determined that the activation of the curtain airbag 4a is not prohibited (Step S34: No), the activation processing unit 22 outputs the activation signal Scnt3 for activating the curtain airbag 4a to the power supply unit 10 (Step S35). After that, the activation processing unit 22 prohibits the activation of the curtain airbag 4a for a predetermined time (Step S36).

When the process of Step S36 is terminated or when it is determined that the activation of the curtain airbag 4a is prohibited (Step S34: Yes), the activation processing unit 22 terminates the process illustrated in FIG. 11.

In the process of Steps S12, S16, S19, S21, S33, and S36, the activation processing unit 22 can prohibit the output of the activation signal Scnt of the occupant protection device 9 whose activation succeeds when receiving the response signal Sok indicating activation success of the occupant protection device 9 from the power supply unit 10. Moreover, the activation processing unit 22 can again output the activation signal Scnt of the occupant protection device 9 whose activation fails when receiving the response signal Sng indicating activation failure of the occupant protection device 9 from the power supply unit 10.

4. Others

The type and arrangement of the occupant protection device 9 is not limited to the example described above. Moreover, the processes for the front and side crashes described above are one example, and thus the processes for the front and side crashes may be performed by the occupant protection device 9 to be activated and at the activation timing that are different from the example described above.

For example, the front-crash detection condition and the side-crash detection condition have been explained as an example of conditions for activating the one or more occupant protection devices 9. However, it is possible to activate the one or more occupant protection devices 9 on the basis of a detection condition on a crash (hereinafter, referred to as rear crash) against to the rear face of a vehicle, for example. As a result, when the rear crash is performed after the front crash, for example, the activation process of the occupant protection device 9 activated for the front crash can be prohibited from being again performed in correspondence with the rear crash.

The controller 20 or the power supply unit 10 of the ECU 1 can also detect a connection state between the battery 8 and the ECU 1. In this case, the controller 20 or the power supply unit 10 can perform the prohibition process described above when detecting that the connection between the battery 8 and the ECU 1 is cut off, and cannot perform the prohibition process described above when the connection between the battery 8 and the ECU 1 is not cut off. Moreover, on condition that the battery voltage Vbat is not more than a predetermined value, the controller 20 or the power supply unit 10 can perform the prohibition process described above. Moreover, a time (time defined by predetermined time T2, for example) in which the prohibition process described above is continued can be changed for each of the occupant protection devices 9.

5. Effects

As described above, the control device (for example, ECU 1) according to the embodiment includes the power supply unit 10 and the controller 20. The power supply unit 10 performs the supply of power to the squib 70 for activating the occupant protection device 9 (for example, side airbag 3a). When the first condition (for example, front-crash detection condition) is satisfied, the controller 20 causes the power supply unit 10 to perform the supply of power to the squib 70 at the first timing (for example, timing at which front crash is detected). Moreover, when the second condition (for example, side-crash detection condition) is satisfied, the controller 20 causes the power supply unit 10 to perform the supply of power to the squib 70 at the second timing (for example, timing at which predetermined time T1 elapses after detecting side crash). Then, when the first condition and the second condition are satisfied simultaneously or continuously, for example, at least one of the controller 20 and the power supply unit 10 supplies power to the squib 70 at one timing (for example, times t30 to t31 illustrated in FIG. 7) that is the earliest timing of the first and second timings, and then prohibits the supply of power to the squib 70 at the other timing (for example, times t32 to t33 illustrated in FIG. 7). As a result, because the transmission of the activation signal Scnt corresponding to the other timing is prohibited, it is possible to suppress the consumption of power. For that reason, in comparison with when the transmission of the activation signal Scnt is not prohibited, the electrostatic capacitance value of the capacitor 42 in the backup circuit 11 can be suppressed, and thus, for example, the cost reduction and miniaturization of the ECU 1 can be achieved.

The controller 20 includes the activation determining unit 21 and the activation processing unit 22. The activation determining unit 21 determines whether each of the first and second conditions is satisfied, and the activation processing unit 22 transmits the activation signal Scnt to the power supply unit 10 on the basis of the determination results of the activation determining unit 21. The power supply unit 10 includes the output unit 14 and the driving unit 15. The output unit 14 outputs power to the squib 70. When receiving the activation signal Scnt from the controller 20, the driving unit 15 causes the output unit 14 to supply power to the squib 70. As a result, because the transmission of the activation signal Scnt corresponding to the other timing can be prohibited by software, for example, the number of parts of the ECU 1 can be suppressed and thus, for example, the miniaturization of the ECU 1 can be achieved.

The activation processing unit 22 prohibits the transmission of the activation signal Scnt corresponding to the other timing for the predetermined time T2 after transmitting the activation signal Scnt corresponding to the one timing. As a result, the transmission of the activation signal Scnt corresponding to the other timing can be prohibited by, for example, software for a predetermined time.

The driving unit 15 of the power supply unit 10 determines whether the supply of power to the squib 70 is normally performed, and transmits the determination result to the activation processing unit 22. When it is determined that the supply of power is not normally performed on the basis of the determination result transmitted from the power supply unit 10, the activation processing unit 22 retransmits the activation signal Scnt to the power supply unit 10. When it is determined that the supply of power to the squib 70 is normally performed, the activation processing unit 22 prohibits the supply of power to the squib 70. As a result, because the prohibition of the supply of power to the squib 70 is not performed in the event of the retransmission of the activation signal Scnt, the supply of power to the squib 70 can be performed with high precision. Moreover, even if noises are superimposed on communication between the controller 20 and the power supply unit 10, the supply of power to the squib 70 can be performed with high precision.

The driving unit 15 prohibits the control for the output unit 14 based on the activation signal Scnt corresponding to the other timing for the predetermined time (for example, predetermined time T2) after receiving the activation signal Scnt corresponding to the one timing to cause the output unit 14 to supply power to the squib 70. As a result, because the prohibition of the supply of power to the squib 70 is performed in the driving unit 15, the transmission of the activation signal Scnt can be prohibited for a predetermined time and thus the consumption of power can be suppressed even if the same activation signal Scnt is output repeatedly due to a malfunction of the controller 20.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device that controls activation of occupant protection devices each of which include a squib, the control device comprising:

a power supply circuit that supplies power from a power source to one or more squibs for activating one or more devices of the occupant protection devices; and a controller operatively connected to the power supply circuit, the controller being programmed to:

determine whether a first condition for activating first two or more devices of the occupant protection devices is satisfied;

determine whether a second condition for activating second one or more devices of the occupant protection devices is satisfied;

in response to the first condition being satisfied, cause the power supply circuit to perform the supply of power to first two or more squibs of the first two or more occupant protection devices corresponding to the first condition at timings that are different between a part and a remaining of the first two or more occupant protection devices;

in response to the second condition being satisfied, cause the power supply circuit to perform the supply of power to second one or more squibs of the second one or more occupant protection devices corresponding to the second condition at a timing, the second one or more occupant protection devices being included in the remaining of the first two or more occupant protection devices; and in response to the first and second conditions being satisfied simultaneously or continuously, perform the supply of power to the second one or more squibs and first one or more squibs of the part of the first two or more occupant protection devices at a first timing, and then prohibit the supply of power to the second one or more squibs to perform the supply of power to first one or more squibs of the remaining of the first two or more occupant protection devices except for the second one or more occupant protection devices at a second timing that is after the first timing.

2. The control device for the occupant protection device according to claim 1, wherein the controller is further programmed to transmit an activation signal to the power supply circuit in response to each of the first and second conditions being satisfied, and the power supply circuit comprises:

an output circuit that outputs power to the squib; and a driver that causes the output circuit to supply the power to the squib when receiving the activation signal from the controller.

3. The control device for the occupant protection device according to claim 2, wherein the controller is further programmed to prohibit transmission of the activation signal corresponding to the second timing for a predetermined time after transmitting the activation signal corresponding to the first timing.

4. The control device for the occupant protection device according to claim 2, wherein the controller is further programmed to cause the driver to prohibit control for the output circuit based on the activation signal corresponding to the second timing for a predetermined time after receiving the activation signal corresponding to the first timing to cause the output circuit to supply the power to the squib.

5. A control method that controls activation of occupant protection devices each of which includes a squib, the control method comprising:

performing supply of power from a power source to one or more squibs for activating one or more devices of the occupant protection devices;

determining whether a first condition for activating first two or more devices of the occupant protection devices is satisfied;

determining whether a second condition for activating second one or more devices of the occupant protection devices is satisfied;

in response to the first condition being satisfied, performing the supply of power to first two or more squibs of the first two or more occupant protection devices corresponding to the first condition at timings that are different between a part and a remaining of the first two or more occupant protection devices;

in response to the second condition being satisfied, performing the supply of power to second one or more squibs of the second one or more occupant protection devices corresponding to the second condition at a timing, the second one or more occupant protection devices being included in the remaining of the first two or more occupant protection devices; and in response to the first and second conditions being satisfied simultaneously or continuously, performing the supply of power to the second one or more squibs and first one or more squibs of the part of the first two or more occupant protection devices at a first timing, and then prohibiting the supply of power to the second one or more squibs to perform the supply of power to first one or more squibs of the remaining of the first two or more occupant protection devices except for the second one or more occupant protection devices at a second timing that is after the first timing.

* * * * *